Sept. 30, 1958 J. N. SMITH 2,854,652

INFORMATION SELECTING CIRCUIT

Filed March 25, 1954 2 Sheets-Sheet 1

INVENTOR.
Joel N. Smith

BY Morris A. Rabkin

ATTORNEY

Sept. 30, 1958 J. N. SMITH 2,854,652

INFORMATION SELECTING CIRCUIT

Filed March 25, 1954 2 Sheets-Sheet 2

INVENTOR.
Joel N. Smith
BY Morris [signature]
ATTORNEY

United States Patent Office 2,854,652

Patented Sept. 30, 1958

2,854,652

INFORMATION SELECTING CIRCUIT

Joel N. Smith, Westmont, N. J., assignor to Radio Corporation of America, a corporation of Delaware Application March 25, 1954, Serial No. 418,679

10 Claims. (Cl. 340—173)

This invention relates to information handling devices, and more particularly to arrangements which sort and collate information.

Modern commercial activities are increasingly tending to employ automatic information handling facilities. The speed and reliability of such automatic systems, and the economies that they provide, are resulting in their use in widely diversified fields.

Among the earliest of these automatic information handling facilities were punched card systems for sorting, collating, and tabulating. Punched card systems are today widely employed for these functions. These existing systems are, however, inherently limited in speed and flexibility because of physical difficulties in handling and sensing punched cards. Punched cards have further limitations because of the relatively small amount of information which can be "packed" upon them. Much faster information translating speeds, and much greater information density, and therefore greater economy than that which can be attained by punched card systems, can be attained by the use of magnetic tape as an information storage medium in conjunction with electronic devices for information translation. Such magnetic tape techniques are employed extensively in the computing art, and have been developed to a high state of reliability. These techniques, and the concomitant structures, however, have not heretofore been widely employed in the information handling fields which deal with other than mathematic and numeric information. Many modern commercial applications may beneficially employ such devices in accomplishing routine sorting, selecting, and collating functions of a repetitive nature.

An information handling system, such as a computer, may place information in a desired order, select desired information, or merge various groupings of information from different sources, while maintaining automatic checking of its own operations. In order to perform sorting and collating on desired groupings of information, such a device may select a given part out of each block of information, and use the given part as its basis for decision. As a specific example, a block of information may contain the name of a person, his address, and other information having pertinence to a desired sorting process. Further, other persons may be assigned similar groupings of information composed of similar blocks, and it may be desired, among other things, to make separate listings alphabetically, by address, or by other identification. Some device is needed, therefore, which selects only the information grouping that is to be employed for making the desired listing.

Added complications are encountered with systems which employ variable word and message lengths. These systems may separate words (groups of characters) and messages on a magnetic tape medium by significant separation symbols. Thus, messages may begin with a start message (SM) symbol, and end with an end message (EM) symbol, while documents comprised of a number of messages commence with a start document (SD) symbol. Similarly, items, which term includes words, terminate in item separation symbols (ISS). Information in such a system is stored as a train of characters grouped first into items and then into messages. After the commencement of a message (SM or SD symbol), individual items, each terminating in an ISS symbol, appear sequentially. The items may be composed of variable numbers of characters, and the message may be composed of variable numbers of items. For purposes of illustrating the invention, it is assumed here that given groups of items within a message pertain to given subjects. For example, the first four items may contain personal names, the next three may contain addresses, and the following three may contain information as to occupation or profession. A function of the device of the present invention is to select a given group of items, or a given group of characters, from within a message for utilization in an information handling system.

Accordingly, the present invention has a number of objects related to information handling systems in general, and to a magnetic tape sorter utilizing electronic means in particular. These objects include:

(1) The provision of a novel system for selecting predetermined groupings, items or characters from a train of information.

(2) The provision of a novel arrangement, operable with a system which transfers entrained character which together form messages comprised of individual items, and which include start message, item end, and end message symbols, which arrangement selects for transfer either given items in the train of characters, or given characters within given items.

(3) The provision of a novel electronic device responsive to messages of variable lengths recorded in series, for selecting desired data groupings from the characters.

(4) The provision of a novel arrangement operable with a tape sorting device which utilizes significant item terminating symbols, message and document commencing, and message terminating symbols, to select predetermined items for character groupings within a message for transfer within a tape sorting system.

According to the invention, signals in a train of characters are transferred to a utilization device only when preselected conditions, as determined by associated gating and counting means, are satisfied. If a predetermined number of items following the commencement of a message are not to be used as the basis of sorting, transfer to the utilization device is prevented until these items have passed. Then the system may select either a given number of the following transfer-determinative items and transfer them entirely, or it may count a number of characters which follow and then transfer a predetermined number of characters. Items are recognized by individual gates responsive to the particular symbols employed for item and message termination, and message and document commencement. Desired conditions of operation are chosen by selector switches. A gating unit is employed to transfer or to block transfer of messages. A first counter counts items following the start of a message and either opens the gating unit or actuates a character counter, depending on whether a number of items or a number of characters are to be transferred. If a number of characters are to be transferred, the character counter opens the gate at the proper count or time. Each of these units also activates further counters which close the gating unit or complete transfer of the desired block or number of characters or items. Additional arrangements are also provided to close the gating unit and to reset the system when a predetermined maximum number of characters has been transferred, or when a message has terminated.

The system with which this invention is employed may use a seven digit alpha-numeric binary code. That is, alphabetic and numeric characters, and special symbols, may be represented by significant and individual binary code combinations of seven digits. Individual decimal characters from 0 to 9, as well as alphabetic characters, are arranged serially. A message may be recorded on magnetic tape and may be comprised of a wide variety of information-bearing items.

The novel features of the invention, as well as the invention itself, both as to its organization and method of operation, will best be understood from the following description, when read in connection with the accompanying drawings, in which like reference numerals refer to like parts, and in which.

Figure 1:
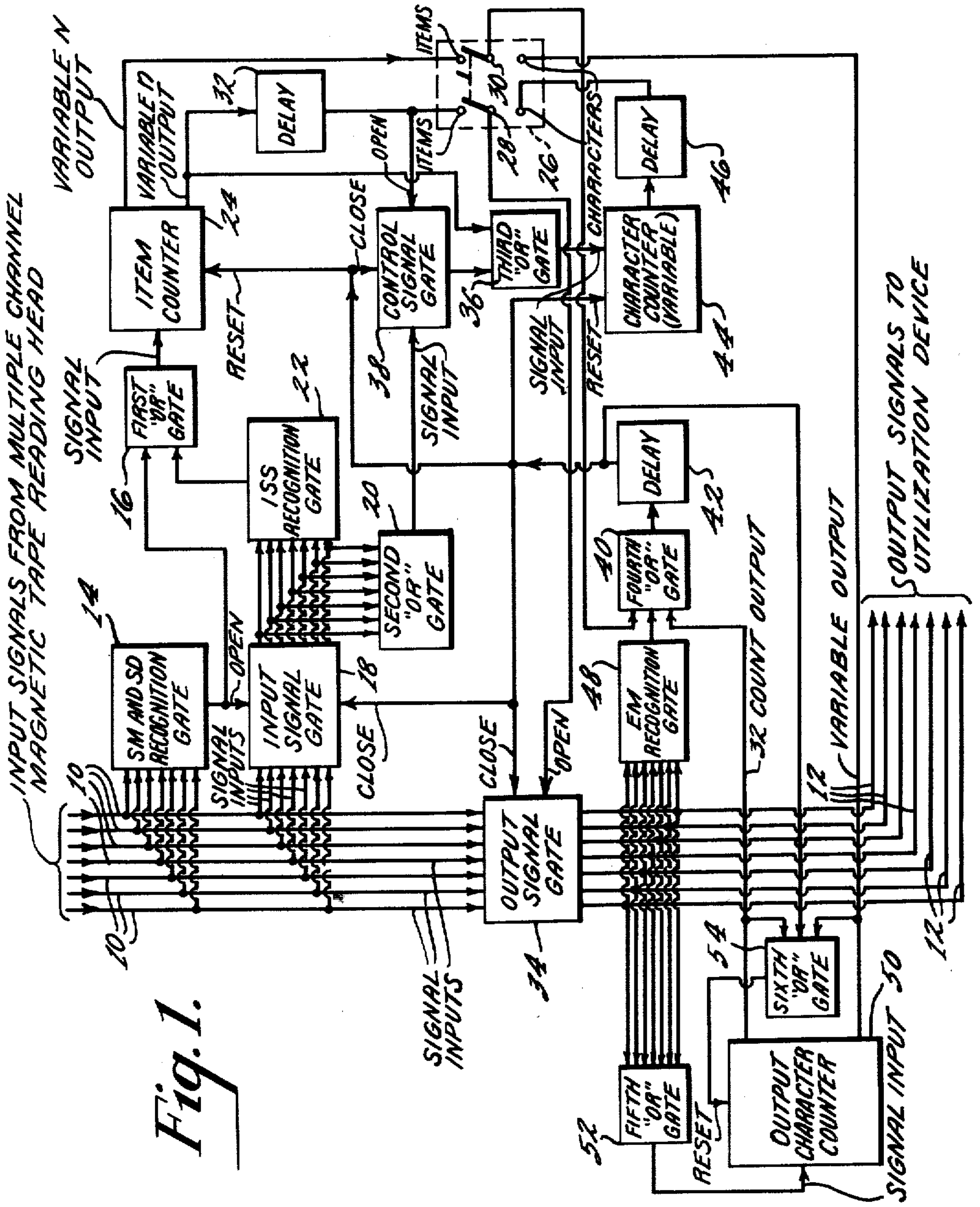
Fig. 1 is a block diagram of an arrangement for practicing the invention.

Referring to Fig. 1, a data selecting system according to this invention may receive the binary coded combinations of signals in seven parallel input channels or conductors 10 from a multiple channel magnetic tape reading head (not shown), and transmit only a desired segment of a train of those signals through seven parallel output channels or conductors 12 to a subsequent utilization device (not shown). The utilization device may be, for example, a memory of fixed capacity, employed for purposes of comparing one segment of information with a separately derived segment of information.

Signals in the seven parallel input channels 10 are first directed to a code recognition device 14 of the type described in Patent No. 2,648,829 entitled "Code Recognition System" and issued on August 11, 1953 to William R. Ayres and Joel N. Smith. Such a device provides an output only when the signal configurations on its inputs represent a predetermined character or characters. This recognition device 14 is responsive to start message (SM) or start document (SD) combinations or symbols, and is accordingly designated as the SM and SD recognition gate 14. The output of the SM and SD code recognition gate 14 is coupled to one input of a two input first "or" gate 16, and also to the open input of a seven channel input signal gate 18. "Or" gates, also known as mixer gates, have several inputs and provide an output when and only when a signal of proper polarity is present on any one or more of its inputs. The seven channel input signal gate 18 has seven signal inputs, each of which is coupled to one of the seven input channels 10, and the gate 18 also a close input and an open input. The input signal gate 18 is "opened," to provide output signals in response to signals on the input channels 10, by the application of a signal to its open input. A signal applied to the close input of the input signal gate 18 causes the gate 18 to block further transfer of signals from the input channels 10 through the gate 18. This signal gating action may be accomplished by any of several well-known means. For example, the alternate open and close conditions may be established by the alternate outputs of a bistable multivibrator, or flip-flop. In the open condition the flip-flop may activate one input of a two input Rossi or other coincidence gate in each channel. Signals to be transferred may then be applied to the remaining inputs of the coincidence gates, which gates thus provide outputs to effect the transfer of signals. When the flip-flop is switched to the close condition the coincidence gates do not have one activated input, and thus do not provide outputs.

The outputs of this input signal 18 are coupled to the seven inputs of a second "or" gate 20 and also the seven inputs of an item separation symbol (ISS) recognition gate 22. The item separation symbol recognition gate 22 may be of the type referred to in the previously mentioned Patent No. 2,648,829 granted to Ayres and Smith. The item separation symbol (ISS) recognition gate 22 provides an output on the application of the symbol (ISS) which characterizes the termination of an item. The output of the ISS recognition gate 22 is connected to the remaining input of the first "or" gate 16. The output of the first "or" gate 16 is coupled to the signal input of a predetermined item counter 24 having two outputs, here identified as the variable *n* and variable N outputs. Predetermined counters are well known in the art, and may be set to provide an output on counting a predetermined number of signal inputs. The count may be varied as desired by manual or automatic means. An arrangement which may be advantageously employed for the purposes of providing two different outputs is shown and described hereinafter in connection with Fig. 2. In the example shown in Fig. 1, the item counter 24 provides an output first on reaching *n* signal inputs, and then on reaching N signal inputs. The item counter 24 has a reset input for restoring the counter to a starting condition.

The system thus far described operates to recognize the commencement or start of a train of characters, to count the items in the train of characters, and to provide an output signal from the item counter 24 when predetermined conditions have been satisfied. The counter 24 output is utilized to control, selectively, a further arrangement for counting the characters within a particular item. This further arrangement includes a double-pole double-throw switch 26 composed of coupled first and second arms 28 and 30, each of which arms is associated with a different pair of fixed contacts. The contacts of each pair are designated similarly herein, one being termed the item contact and the other the character contact. The entire switch 26 is indicated as a block formed by dotted lines. Both item contacts, or both character contacts, are made at the same time by movement of the coupled arms 28 and 30 to the corresponding position. When the first arm 28 makes with the item contact, the variable *n* output of the item counter 24 is coupled through a delay line 32 to the open input of an output signal gate 34.

The output signal gate 34 may be of the same type as the input signal gate 18. The output signal gate 34 has seven signal inputs, each connected to a different one of the input channels 10, and seven signal outputs, each connected to a different one of the output channels 12. The output signal gate 34 thus controls the transfer of signals from the input channels 10 to the output channels 12 of this system, in response to open and close signals on its open and close inputs.

The variable *n* output of the item counter 24 is also coupled directly to a first input of a third "or" gate 36 having two inputs. The output of the delay line 32 which couples the variable *n* output of the item counter 24 to the first switch arm 28 is also coupled to the open input of a control signal gate 38. The control signal gate 38, which again may be the same type of signal gate as input signal gate 18 or output signal gate 34, has its signal input coupled to the output of the second "or" gate 20, and its output coupled to the second input of the third "or" gate 36.

When the item contacts are selected by means of the switch, the variable N output of the item counter 24 is coupled through the second of the arms 30 to one input of a two input fourth "or" gate 40. The output of the fourth "or" gate 40 is coupled through a delay line 42, (1) to the close input of the output signal gate 34, (2) to the close input of the input signal gate 18, (3) to the close input of the control signal gate 38, (4) to the reset input of the item counter 24, (5) to the reset input of a character counter 44 responsive to a variable number of counts, and (6) to one input of a three input sixth "or" gate 54. The character counter 44, which may be a counter of the type shown in Fig. 2, counts the number of characters which are to be by-passed in selecting a given group of characters (rather than a given group of items). The output of the character counter 44 is coupled through a delay line 46 to the character contact of the first switch arm 28.

The remaining two inputs of the fourth "or" gate 40 are coupled to two separate sources of signals. One of the inputs of the fourth "or" gate 40 is coupled to the output of an end message (EM) recognition gate 48. The EM recognition gate 48 has its inputs coupled individually to the different ones of the outputs from the output signal gate 34, and provides an output only when an end message characteristic symbol is present on those outputs. The remaining input of the fourth "or" gate 40 is coupled to the two outputs of an output character counter 50 which may be similar to the item character counter 24. This output character counter 50 provides two different signals at different outputs. A signal is provided on one output (here called the thirty-two count output) on reaching thirty-two counts, and a signal is provided on the other output (here called the variable output) on reaching a selected character count of variable magnitude. Thirty-two counts have been selected arbitrarily here as the desired maximum for the data which is to be selected from a train of characters. It is assumed that the variable count does not exceed thirty-two, but it will be apparent that the thirty-two may itself be a different number, or be variable.

The seven parallel outputs of the output signal gate 34 are coupled to the seven inputs of a seven input, fifth "or" gate 52, the output of which is coupled to the signal input of the output character counter 50. The thirty-two count output of the output character counter 50 is connected to the remaining input of the fourth "or" gate 40. The variable output of the output character counter 50 is coupled to the first input of the fourth "or" gate 40 when the second arm 30 of the switch 26 makes with the character contact. Each output of the output character counter 50 is coupled to a different input of the three input sixth "or" gate 54, the output of which in turn is fed back to the reset input of the output character counter 50.

Figure 2:
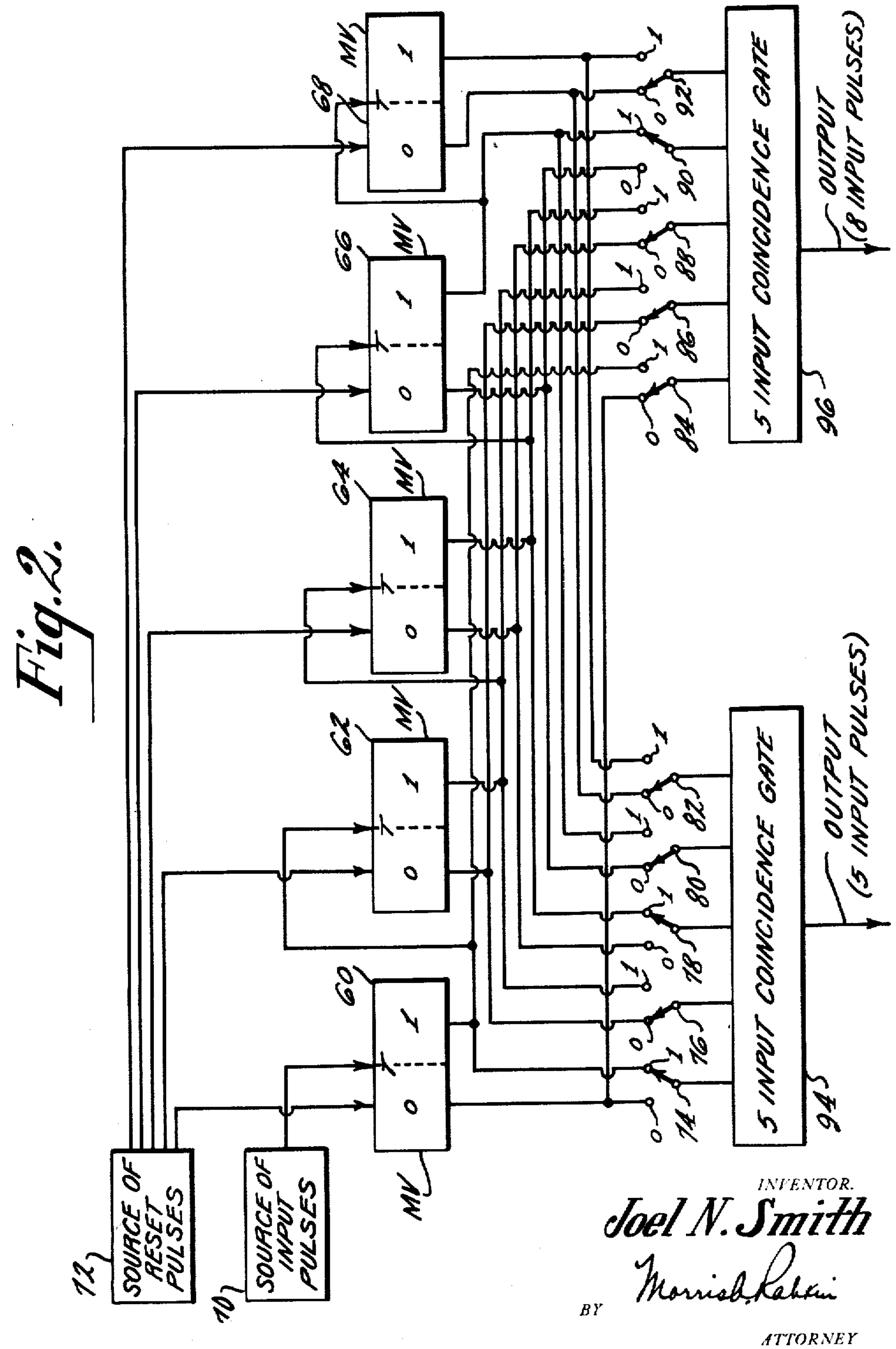
Fig. 2 is a block diagram of a counter system suitable for employment in the correspondingly identified blocks of Fig. 1.

The single binary counter arrangement of Fig. 2 may be advantageously employed in the system of Fig. 1. The binary counter arrangement utilizes a chain of five bistable multivibrators 60, 62, 64, 66, 68, connected in cascade to operate in well-known fashion as a binary counter. Each of these bistable multivibrators 60, 62, 64, 66, and 68 has two sections, designated respectively as "0" and "1." Each multivibrator has two stable states, one in which the output from the "0" section is at a relatively high potential and the output from the "1" section is at a relatively low potential, and a second in which the reverse potential levels obtain. The operation of such a chain of bistable multivibrators is well-known and, therefore, not further described here.

Each of the bistable multivibrators 60, 62, 64, 66, 68 has a trigger input, the application of input pulses to which changes the multivibrator from one stable state to the other. A source of input pulses 70 is coupled to the trigger input of the first multivibrator 60 in the chain, and the output of the "1" section of each multivibrator is coupled to the trigger input T of the next succeeding multivibrator in the chain. Reset pulses to set all the bistable multivibrators in a starting condition in which high level outputs are provided from all the "0" sections are supplied from a source 72.

First and second sets of switches 74 to 82 and 84 to 92 are employed to couple the outputs of the individual multivibrators 60 to 68 selectively to two five-input coincidence gates 94, 96. Each switch 74 to 92 is a single-pole double-throw switch corresponding to one binary order of value, and couples the related multivibrator in the chain to one of the coincidence gates 94 or 96. Each switch of a set has two terminals, one of binary zero value and designated as the "0" terminal, and the other of binary one value and designated as the "1" terminal. When the switches of a set are placed at predetermined terminals, they represent a given binary number.

The two input coincidence gates, here referred to as the first and second coincidence gates 94, 96, respectively, may be any of several types well-known in the art, such as the type referred to as a Rossi gate.

By way of example, the first coincidence gate 94 has been set to provide an output when the counter has counted five inputs. The second coincidence 96 has been set to provide an output after eight input pulses to the counter. In order to achieve this operation, each set of switches is set in binary fashion so that the total count selected is the count desired for the associated coincidence gate 94 or 96. Thus the first set of switches 74 to 82 is set to represent binary 00101, and the second set of switches 84 to 92 is set to represent binary 01000. Note that in the drawing, the usual order of significance of digits is reversed. The binary numbers just written have the coresponding decimal values of five and eight, respectively. When the count has advanced binary-wise along the trigger chain until the binary equivalent of decimal five has been reached, a high level output is provided at one time from the multivibrators 60 to 68 through the first set of switches 74 to 82 to each of the inputs of the first coincidence gate 94. These high level outputs at one time trigger the first coincidence gate 94, which provides an output. Similarly, when the count has advanced binary-wise to the binary equivalent of decimal eight, the high level outputs on the multivibrators 60 to 68 and the second set of switches 84 to 92 provide simultaneous high level outputs to the second five-input coincidence gate 96, and the second coincidence gate 96 provides an output. The arrangement permits the use of a single binary counter to provide an output indication at two different counts, thus effecting a considerable saving of equipment. The same arrangement may be employed advantageously with a greater number of coincidence gates and selector switches, to provide an even greater number of variable outputs. It is to be noted that the most simple form of selector switch has been shown in this illustration but that other forms may be employed if desired.

The arrangement of Fig. 1 may operate in either one of two modes. In a first mode of operation, the arrangement of Fig. 1 selects desired items from a train of characters which constitute a message. In a second mode of operation, the arrangement of Fig. 1 selects desired characters following a desired number of characters and a desired number of items. Either one of these modes of operation is chosen by setting the item and character counters 24, 44, 50 to provide an output at desired counts and by throwing the switch 26 to the appropriately designated terminals.

A train of input signals are derived on the input channels or conductors 10 from an external source. It will be assumed here that each message represents a separate block of information, and that documents, messages, and items are identified by significant combinations as previously described.

An example of the first mode of operation of the system is given with reference to a selection of certain items from within the messages. By way of illustration, three items starting with the fifth item may be desired as the basis for decision. The quantity 5 then represents $n$, and the quantity 8 represents N, so that the item counter 24 is set correspondingly to provide outputs when the proper numbers of input pulses have been counted. The double-throw switch 26 is placed at the item contacts, and all signal gates 18, 34, 38 are closed. As the start of a message is carried on the input channels 10, the SM or SD signal is detected by the SM and SD recognition gate 14. The output provided by the SM and SD recognition gate 14 commences the operation of the data selection process. The SM and SD recognition gate output 14 opens the input signal gate 18 and provides a signal input to the item counter 24. Input signals subsequent to the SM or SD signals pass through the open input signal gate 18 to the ISS recognition gate 22, but only signals (ISS) denoting the termination of an item actuate the ISS recognition gate 22 to provide an output therefrom. The output of the ISS recognition gate 22 passes through the first "or" gate 16 to the input of the item counter 24. When four ISS signals and an SM or SD signal have been counted, the item counter 24 provides a signal on the $n$ output. The $n$ output of the item counter 24 is delayed for a short period in the coupled delay line 32, and then opens both the control signal gate 38 and the output signal gate 34. The delay of the signal prevents opening of the control signal gate 38 until undelayed signals resulting from the same input signals have passed through the input signal gate 18 and the second "or" gate 20 and have terminated. Subsequent input signals thus pass through the output signal gate 34 to the output channels 12 until the desired data grouping has been completely transferred.

In this illustration of the operation of the invention, the flow of output signals is stopped upon the occurrence of any one of three conditions. These conditions are: (1) that the desired number N (for example, eight) has been counted by the item counter 24, (2) that the maximum number of characters desired (for example, thirty-two) have been provided as output, or (3) that the message has terminated. These conditions are provided as signals to the three separate inputs of the fourth "or" gate 40. When the third item passes after data selection has begun, the item counter 24 provides a signal on the N output (a total of eight signals having been counted). This item counter 24 output passes through the second arm 30 of the switch 26 to one input of the fourth "or" gate 40. Accordingly, the fourth "or" gate 40 provides an output which passes through a delay line 42 to the close inputs of the output signal gate 34, the input signal gate 18, and the control signal gate 38. The provision of the delay line 42 here prevents the closing of the signal gates 18, 34, 38 until undelayed signals from the same input signals have terminated. The output of the fourth "or" gate thus blocks off or prevents the transfer of further output signals through the output signal gate 34.

Output signals may also be blocked off by the transfer of the predetermined maximum number of signals, as detected by the output character counter 50. Each signal combination from the output signal gate 34 provides a single output from the coupled fifth "or" gate 52, which single "or" gate 52 output is applied to the output character counter 50. When the desired group of items contain more than thirty-two characters in this example, the output character counter 50 provides a signal from its thirty-two count output to the fourth "or" gate 40. The output of the fourth "or" gate 40, as previously described, then closes all the signal gates 18, 34, 38 and blocks the transfer of further output signals to the output channels 12.

The occurrence of an end message signal (EM) signifies that no further characters are available in the message for utilization. The existence of an EM symbol is detected by the EM recognition gate 48 coupled to the output signal gate 34, and the EM recognition gate 48 provides an output to the fourth "or" gate 40 to stop the system as previously described.

The output of the fourth "or" gate 40, after delay, also resets the item counter 24, to enable the system to repeat operation under the same conditons. Similarly, the output character counter 50 outputs are fed back through the sixth "or" gate 54 to the reset input of the same character counter 50 to place it again in a starting position.

The second mode of operation to be exemplified here is that in which a given number of items, followed by a given number of characters, are to be by-passed, and then a given number of characters are to be selected from the train of input signals. For example, it may be desired to by-pass the first three items of a message and also the first five characters of the succeeding fourth item. In addition, only the subsequent eighteen characters may be desired to be used. To obtain this second mode of operation, the switch 26 is thrown to the character terminal, all signal gates 18, 34, 38 are closed, and all counters 24, 44, 50 are reset. Further, the item counter 24 is set to provide an $n$ output at four, the variable character counter 44 is set at six, and the output character counter 50 is set to provide a signal from its variable output at the count of eighteen. Upon commencement of a train of signals, therefore, an SM signal, followed by three ISS signals, are sent to the item counter 24 as previously. Again the item counter 24 provides an $n$ output which, after a delay, opens the control signal gate 38. In this instance, however, the item counter 38 output also passes through the third "or" gate 36 to the signal input of the variable character counter 44.

During the period that the control signal gate 38 is closed, individual signals from the input signal gate 18 provide a single output from the second "or" gate 20, which single outputs in turn are blocked at the closed control signal gate 38. The opening of the control signal gate 38, however, permits further signals to pass through to the third "or" gate 36 and to the variable character counter 44. After a total of six pulses are applied to the variable character counter 44 (the item counter 24 output plus five second "or" gate outputs), the character counter 44 provides an output signal. The character counter output signal passes through a delay line 46 and through the first arm 28 of the switch 26 which (now being at the character contact) passes the signal to the output signal gate 34. This output opens the output signal gate 34, permitting further signals on the input channels 10 to be transferred through the output signal gate 34 to the output channels 12.

The transfer of signals to the output channels 12 is stopped when preselected conditions have been met and a signal applied through the fourth "or" gate 40 to the close input of the output signal gate 34. One of these conditions is the same as one described in the previous example, namely that an end message signal has been recognized. The other condition is that in which the output character counter 50 counts the transfer of eighteen character signals to the output channels 12. Transferred signals are directed to the output character counter 50 from the fifth "or" gate 52, and the counter 50 provides a signal on its variable output to the fourth "or" gate 40 through the coupled switch 26 then at the character terminal.

As in the first mode of operation, the outputs of the output character counter 50 are used to reset that counter 50, and any output from the fourth "or" gate 40 also resets all counters 24, 44, 50 and closes all signal gates 18, 34, 38 to prepare the system for repetitive operation.

Thus there has been described a novel and efficient system for selecting a given sequence of characters from a train of characters. The basis for selection may be made to vary widely, yet selection may be accomplished simply. The system described is capable of use in many environments, and may operate with widely varying structural units. For example, the units may employ diode gating, electron discharge devices, or semi-conductor devices.

What is claimed is:

1. In a system for handling information represented by trains of characters grouped into items and messages, an arrangement for selecting desired information groupings comprising an information gating means responsive to said trains of characters, means responsive to said trains of characters for closing said gating means until predetermined conditions have been satisfied, and means including counting means responsive to said trains of characters for opening said gating means to admit only a predetermined number of said groupings of information.

2. In a system for sorting information represented by trains of characters grouped into items and messages, said messages commencing in significant signals and said items and messages terminating in significant signals, an arrangement for selecting desired information groupings comprising an information gating means responsive to said trains of characters, means coupled to said gating means and responsive to said significant signals for closing said gating means until predetermined conditions have been satisfied following the commencement of a message, and means including counting means coupled to said gating means and responsive to said significant signals for opening said gating means to admit only a predetermined number of said groupings of information.

3. In a system for sorting information represented by trains of characters grouped into items and messages, said messages commencing in significant signals and said items and messages terminating in significant signals, an arrangement for selecting both given item and given character groupings comprising a signal gate responsive to said trains of characters, means including counting means coupled to said signal gate and responsive to said trains of characters and said significant signals for selectively closing said gate until predetermined numbers of significant signals and characters have been provided following the commencement of a message, and means including counting means coupled to said signal gate and responsive to said trains of characters and said significant signals for selectively opening said gate for only predetermined numbers of characters and items.

4. In a system for manipulating information represented by trains of characters grouped in discrete information-bearing blocks, an arrangement for selecting desired information groupings comprising means responsive to said trains of characters for selectively transferring said trains of characters, means for detecting said discrete blocks, means including counting means coupled to said transferring means and responsive to said detecting means for closing said transfer means until a predetermined number of said blocks have been by-passed, and means coupled to said transfer means and responsive to said detecting means for opening said transfer means to admit only a predetermined number of said blocks.

5. In a system for manipulating information represented by trains of characters grouped into discrete information-bearing blocks, said blocks being grouped into messages, an arrangement for selecting a desired sequence of said characters comprising means responsive to said trains of characters for selectively transferring said characters, means for detecting the commencement of said messages, means for detecting the terminations of said blocks and said messages, means including counting means coupled to said transferring means and responsive to said trains of characters and said commencement and termination detecting means for closing said transferring means until a predetermined sequence has occurred following the commencement of a message, and means coupled to said transferring means and responsive to said trains of characters and said termination detecting means for again closing said transferring means after a predetermined information sequence has been provided from said transferring means.

6. In a system for manipulating information represented by trains of characters grouped into items and messages, said messages having start signals and said items having terminating signals, an arrangement for selecting given item and character groupings comprising a signal gate responsive to said trains of characters, means responsive to said trains of characters for providing a first output on the occurrence of a start message signal, means responsive to said trains of characters for providing a second output on the occurrence of said item terminating signals, means including counting means coupled to said signal gate and responsive to said first and second outputs and to said trains of characters for selectively closing said gate until predetermined numbers of said item terminating signals and said characters have been provided following said first output, and means including counting means coupled to said signal gate and responsive to second outputs and to said trains of characters for closing said gate on the transfer therethrough of predetermined numbers of said characters and said terminating signals.

7. In a system for transferring messages comprised of items formed into trains of characters, each of said items having a significant terminating signal and said messages having significant commencing and terminating signals, a system for selecting either (1) a given number of items following a predetermined number of items or (2) a given number of characters following a predetermined number of characters and a predetermined number of items, said selecting system comprising gating means responsive to said trains of characters for selectively blocking the transfer of said characters, means responsive to said trains of characters for detecting said commencing signals, means responsive to said trains of characters for detecting said terminating signals, a first counting means responsive to said commencing signal detecting means for providing a first output on the occurrence of a predetermined number of items following a commencing signal, and for providing a second output on the occurrence thereafter of a predetermined number of items following said first output, a second counting means responsive to said first output and to said trains of characters for providing a third output on the occurrence of a predetermined number of characters following said first output, means selectively coupling said gating means to said first and second counting means to open said gating means on the occurrence of one of said first and third outputs, a third counting means coupled to said gating means and responsive to said trains of characters for providing a fourth output on the occurrence of a predetermined number of characters following said third output, means coupled to said gating means and responsive to the train of characters transferred from said gating means for detecting the existence of a terminating message signal in said train of characters, and providing an output to close said gating means on the existence of said signal, and means selectively coupling said gating means to said first and third counting means to close said gating means on the occurrence of one of said second and fourth outputs.

8. In a system for transferring messages comprised of items formed into trains of characters, each of said items having significant terminating signals and said messages having significant commencing and terminating signals, a system for selecting either (1) a given number of items following a predetermined number of items or (2) a given number of characters following a predetermined number of items and a predetermined number of characters, said selecting system comprising an output signal gate responsive to said trains of characters for selectively blocking the transfer of said characters, a first recognition gate responsive to said trains of characters for detecting said commencing signals, a second recognition gate responsive to said trains of characters for detecting said item terminating signals, means including a first counter responsive to said first and second recognition gates for providing a first output on the occurrence of a predetermined number of items following a commencement signal, and for providing a second output on the occurrence thereafter of a predetermined number of items following said first output, means including a second counter responsive to said first output and to said trains of characters for providing a third output on the occurrence of a predetermined number of characters following said first output, means including a third counter coupled to said output signal gate and responsive to said trains of characters for providing a fourth output on the occurrence of a predetermined number of characters following said third output, a third recognition gate responsive to the train of characters transferred from said output signal gate for detecting said terminating message signals, said third recognition gate being coupled to said output signal gate to close said output signal gate, means selectively coupling said output signal gate to said first and second counters to open said output signal gate on the occurrence of one of said first and third outputs, and means selectively coupling said output signal gate to said first and third counters to close said output signal gate on the occurrence of one of said second and fourth outputs.

9. The invention as set forth in claim 8, wherein said first and third counters are each a single predetermined counter having a pair of coincidence gates coupled to the outputs thereof for providing a signal selectively on the occurrence of a predetermined signal configuration on said outputs, and wherein both said selective coupling means comprise a double-pole double-throw switch.

10. The invention as set forth in claim 8, wherein said second and fourth outputs, and said third recognition gate output, are also applied to said first, second, and third counters to reset said counters.

References Cited in the file of this patent

UNITED STATES PATENTS

| | | |
|---|---|---|
| 2,248,583 | Potts | July 8, 1941 |
| 2,620,878 | Rabenda | Dec. 9, 1952 |